United States Patent [19]

Bleam et al.

[11] Patent Number: 4,962,610
[45] Date of Patent: Oct. 16, 1990

[54] METHOD OF CONSTRUCTING A FISHING LURE BLADE AND BLADE CONSTUCTED THEREBY

[75] Inventors: Richard J. Bleam, Springfield, Mo.; Ronald C. Keller; David N. Keller, both of Fort Smith, Ark.

[73] Assignee: Bass Pro Shops, Inc., Springfield, Mo.

[21] Appl. No.: 331,504
[22] Filed: Mar. 31, 1989
[51] Int. Cl.⁵ .............................. A01K 85/00
[52] U.S. Cl. ..................... 43/42.53; 43/42.5
[58] Field of Search .............. 43/42.5, 42.53; 72/457

[56] References Cited

U.S. PATENT DOCUMENTS

| | | | |
|---|---|---|---|
| 2,246,850 | 6/1941 | Housberg | 43/42.53 |
| 3,750,325 | 8/1973 | Feltman | 43/42.14 |
| 3,775,892 | 12/1973 | Bennetts | 43/42.2 |
| 3,919,802 | 11/1975 | Davis | 43/42.5 |
| 4,033,065 | 7/1977 | Shannon | 43/42.13 |
| 4,471,557 | 9/1984 | Gage | 43/42.53 |
| 4,625,448 | 12/1986 | Borders | 43/42.11 |
| 4,640,041 | 2/1987 | Stanley | 43/42.13 |

FOREIGN PATENT DOCUMENTS 467809 9/1950 Canada .

Primary Examiner—Richard K. Seidel
Assistant Examiner—James Miner

[57] ABSTRACT

A method of constructing a fishing lure blade having a special kicker, and a blade made according to the method. A blade body is inserted at one end into a groove in a special tool and is then bent such that a flap is formed about a bend line determined by the groove depth. The flap is folded over completely and the folded over end of the blade is then inserted into a slot in another tool. The blade is then bent against a 45° inclined surface to form a double thickness lip that is oriented at 45° to the blade body. Finally, the flap is pressed against a flat tool surface until its tip is in line with the opposite edges of the blade body.

4 Claims, 2 Drawing Sheets

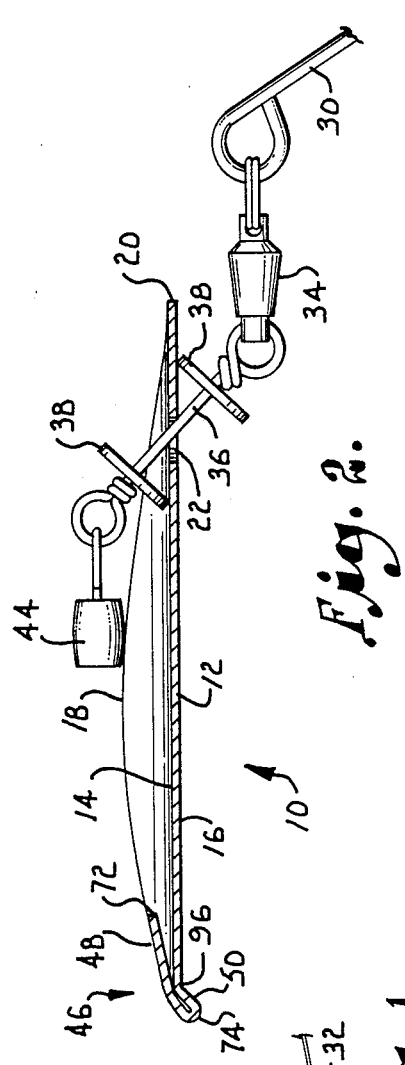
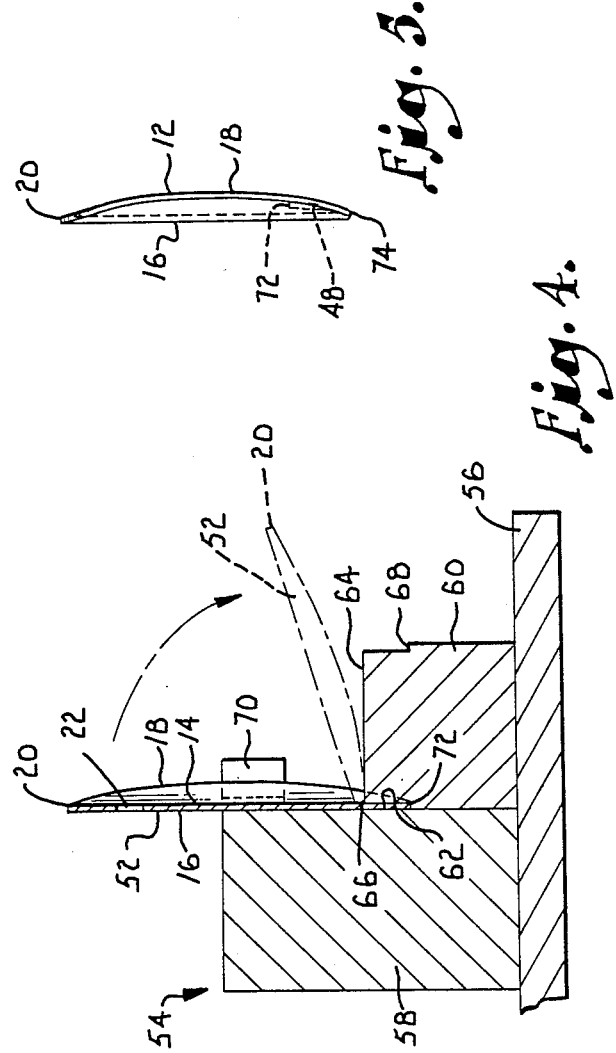
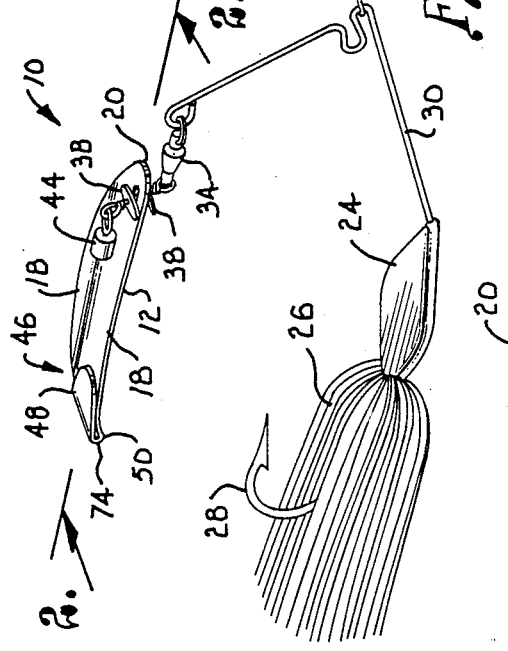
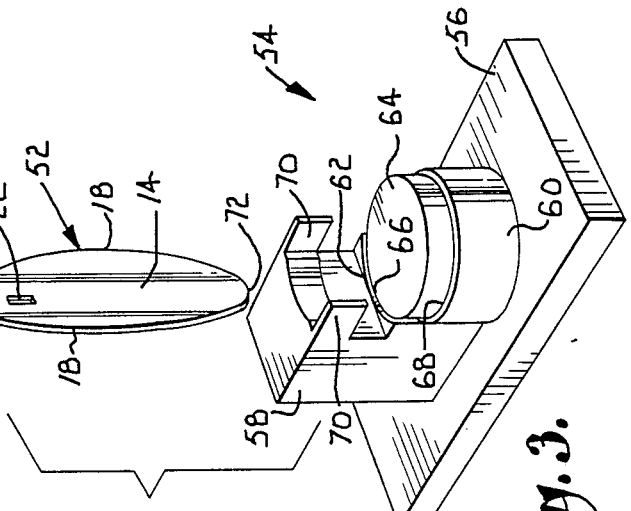

METHOD OF CONSTRUCTING A FISHING LURE BLADE AND BLADE CONSTUCTED THEREBY

BACKGROUND AND SUMMARY OF THE INVENTION

This invention relates in general to fishing lures and deals more particularly with a novel method of making a lure blade and also to a blade that is made according to such method.

It has been found that an artificial fishing lure which includes a skirted jig and a blade having a specially constructed tab or kicker is particularly successful in attracting fish. The kicker is formed by a folded over flap on one end of the blade and an adjacent bent lip that projects at an angle from the opposite side of the blade. The special kicker provides the blade with the action either of a buzz bait or a spinner bait, depending upon whether the lure travels on or below the surface of the water. The lure is also normally equipped with a clapper that provides the rhythmical sounds of a crank bait. When the blade travels along the surface of the water, the kicker flap creates a gurgling type action of the water having the effect of a buzzer bait. When the lure is below water surface, the blade spins in the manner of a spinner type bait.

In order for the buzzing action to properly take place and to be effective in attracting fish, the lip of the kicker must have a size and angle that are carefully controlled within close tolerances. Close tolerances are also required for the size of the flap and the dimension of the gap between its tip and the concave side of the blade. This type of blade has been bent by hand in order to form the kicker, but this has not been satisfactory because the dimensions and angles of the kicker are not consistent due to human error and the inability of human crimping operations to be made with the requisite accuracy. As a consequence, blades that are bent manually are often unable to exhibit the properties that make them attractive to fish, and the effectiveness of the lure suffers accordingly.

The present invention is directed to a method by which a blade body may be bent accurately and repeatedly such that the special kicker is bent in exactly the right places and at exactly the right angles to provide the blade with the desired action in the water. The method includes the use of special tools which assure precision and repeatability in the angles and locations of the bends, thus eliminating the inaccuracies and inconsistencies that are prevalent in manual bending operations. The invention is also directed to a fishing lure blade that is constructed according to the unique method.

In accordance with the invention, a blade body is formed from a coiled strip of anodized aluminum by using a punch press to stamp an oval blade body from the strip, bend the blade body into a concavo-convex shape, and form a slit through the blade body all in one operation. Next, one end of the blade body is inserted into a groove in a special tool, and the blade body is bent to form a flap which is bent along a bend line that has its location determined by the depth of the groove. The blade body is then removed from the tool and the bend is completed by pressing the flap toward the blade body such that it is folded completely over.

The blade is then applied to a second tool having a slot formed between a pair of blocks that are relatively movable toward and away from one another. The bent or doubled over end is inserted into the slot, and the blocks are then closed to clamp the bent end of the blade between them. The blade body is bent until it is against an inclined surface of the tool that is oriented at a 45° angle. This forms a doubled over kicker lip which is oriented at precisely 45° to the blade body and which is controlled in its size by the depth of the slot.

Finally, the blade is removed from the tool and the tongue is pressed against a flat surface until the side edges of the blade body bottom out on the flat surface. This accurately locates the curved tip of the flap away from the concave side of the blade far enough to provide the proper gap that provides the buzz bait action when the blade is drawn along or near the surface of the water.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of an artificial fishing lure which includes a metal blade constructed according to the method of the present invention;

FIG. 2 is a fragmentary sectional view on an enlarged scale taken through the blade generally along line 2—2 of FIG. 1 in the direction of the arrows;

FIG. 3 is a perspective view showing the first step in the bending of the blade which involves inserting the blade into a curved groove in a special tool;

FIG. 4 is a sectional view taken on a vertical plane and showing the blade inserted into the curved groove of the tool with the broken lines showing the blade bent downwardly on the tool to form a flap on the one end of the blade;

FIG. 5 is a side elevational view of the blade showing the flap folded over completely against the body of the blade;

DETAILED DESCRIPTION OF THE INVENTION

Figure 7:
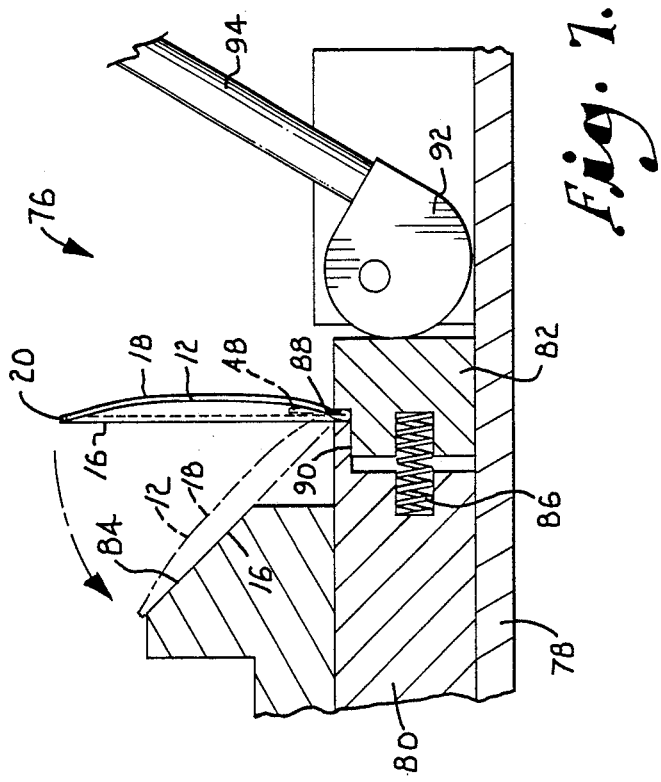
FIG. 7 is a fragmentary sectional view taken on a vertical plane through the tool of FIG. 6 and showing the blade clamped in place in a slot presented by the tool, with the broken line showing the blade bent downwardly against an inclined surface of the tool to form the kicker lip.

Referring now to the drawings in more detail and initially to FIGS. 1 and 2, the present invention is directed to a method of constructing a fishing lure blade which is generally identified by reference numeral 10. The blade has a body 12 which is constructed of a suitable metal such as anodized aluminum approximately 0.025 inch thick. The blade body 12 has a concavo-convex configuration, with a concave surface 14 facing upwardly and an opposite convex surface 16 facing downwardly as viewed in FIGS. 1 and 2. The lure body 12 has curved side edges 18 and a curved tip 20 on its front end. On the front end portion of the lure near the tip 20, a slot 22 is cut through the blade body 12.

As shown in FIG. 1, the blade 10 is used with a jig 24 equipped with a skirt 26 and a fish hook 28. The jig 24 and the blade 10 are carried on the two arms of a bent wire 30 which is tied on a fishing line 32.

A swivel 34 is mounted on the wire 30 and is also connected with a short wire 36 that projects through the slot 22. A pair of teflon washers 38 are mounted slidably on the wire 36 on opposite sides of the lure body 12. A metal clapper 44 is carried on an eye on the end of the short wire 36 at a location where it strikes the blade body 12 as the blade travels in the water.

The trailing end portion of the blade body 12 is provided with a special kicker which is generally identified by numeral 46. The kicker 46 includes a generally flat flap 48 and a double thickness lip 50. The flap 48 extends generally along but is spaced from the concave surface 14 of the blade body 12. The lip 50 extends from the opposite or convex surface 16 at an angle of 45° relative to the longitudinal center line of the blade body 12.

In accordance with the present invention, the kicker 46 is formed on the blade body 12 by bending the blade body using special tools that assure that the bends are made in the proper locations and at the proper angles. Referring to FIGS. 3 and 4, a blade body 52 is formed from a coiled strip of anodized aluminum by stamping the blank 52 from the strip with a punch press, bending the blank into its concavo-convex shape, and forming the slot 22 all in one operation using a punch press.

The first bend is made in the blank 52 by using a special tool which is generally identified by numeral 54 in FIG. 3. The tool 54 includes a flat base 56 on which a pair of blocks 58 and 60 are mounted. A curved groove 62 is formed between the two blocks 58 and 60 and has the same curvature (preferably a radius of curvature of 1 inch) as the blade body. Block 60 has a flat upper surface 64 having a curved edge 66 located immediately in front of the slot 62. The bottom of the groove 62 is formed by a ledge 68 on block 60. The ledge 68 determines the depth of groove 62, and the depth of the groove may be 0.335 inch as measured from the edge 66 to the ledge 68. Block 58 has a pair of guide arms 70 which assist in guiding the blanks 52 into the groove 62.

The initial bend in the blank 52 is made by inserting the blank 52 between the arms 70 with the curved tip 72 of the blank entering groove 62 until it bottoms out on the ledge 68. The top end of the blank 52 may then be grasped and pulled forwardly and downwardly to bend the blank along a bend line 74 which is substantially coincident with the edge 62. The blank 52 may be bent until it engages surface 64 as shown in broken lines in FIG. 4. This bending operation forms the flap 48 which then projects from the concave surface 14 at an angle of approximately 90° to the blade body.

After the blade body has been removed from the tool 54, the bending of flap 48 is completed by pressing it toward the concave surface 14 until the flap has been completely folded over against the blade body about the bend line 74. The tip 72 is then located adjacent to the body of the blade, as shown in FIG. 5.

Figure 6:
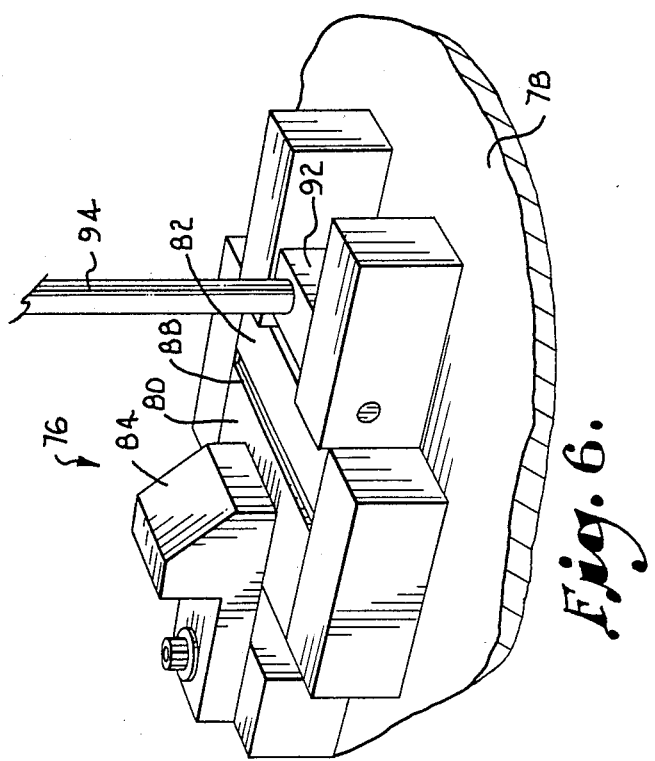
FIG. 6 is a perspective view showing a tool which is used to form a bend for the kicker lip that is formed on the blade.

The double thickness lip 50 is formed through the use of a bending tool which is generally identified by numeral 76 in FIG. 6. The tool 76 includes a flat plate 78 on which a stationary block 80 and a movable block 82 are mounted. Mounted on top of block 80 is an anvil which presents a flat inclined surface 84 oriented at precisely 45° to the plate 78. As best shown in FIG. 7, the movable block 82 is able to slide toward and away from the stationary block 80 and is continuously urged away from block 80 by a compression spring 86. The two blocks 80 and 82 are spaced apart at their top surfaces to present a slot 88, the bottom of which is formed by a flat ledge 90 located on block 82. The ledge 90 determines the depth of the slot 88 and is located 0.110 inch below the top surface of block 82 to give the slot 88 a depth of 0.110 inch. The upper surfaces of blocks 80 and 82 are coplanar.

Block 82 may be moved selectively toward block 80 by a rotatable cam 92 located on the bottom end of an operating handle 94. When the handle 94 is pulled downwardly away from the slot 88, cam 92 acts against block 82 and forces it toward block 80 by camming action, causing the slot 88 to narrow. When the handle 92 is rotated upwardly toward a vertical position, the pressure of the cam against block 82 is relieved, and the compression spring 86 then moves block 82 away from block 80 to cause the slot 88 to widen.

The double thickness lip 50 is formed on the blade by inserting the folded over flap 48 and the adjacent portion of the blade body into slot 88 while handle 92 is in a vertical position to provide the slot with enough width to receive the blade. The blade is inserted until it reaches the position shown in solid lines in FIG. 7, with the bend line 74 bottomed out against the ledge 90. Then, handle 92 is pulled downwardly to rotate the cam such that the blade is securely clamped in slot 88 between the two blocks 80 and 82.

The convex side 16 of the blade faces the inclined surface 84, and the blade may then be bent until the convex surface 16 is disposed with its longitudinal center line against surface 84 in the position shown in broken lines in FIG. 7. Since surface 45 is oriented at 45° to the plate 78, it is also oriented at 45° to the depth dimension of the slot 88. Consequently, the portion of the blade that is clamped in the slot 88 forms the lip 50, and the lip 50 extends from its junction line 96 with the body 12 (see FIG. 2) at an angle of exactly 45° relative to the longitudinal axis of the blade body. In addition, the lip dimension between the bend line 74 and junction line 96 is exactly 0.110 inches, as determined by the 0.110 inch depth of slot 88.

Figure 8:
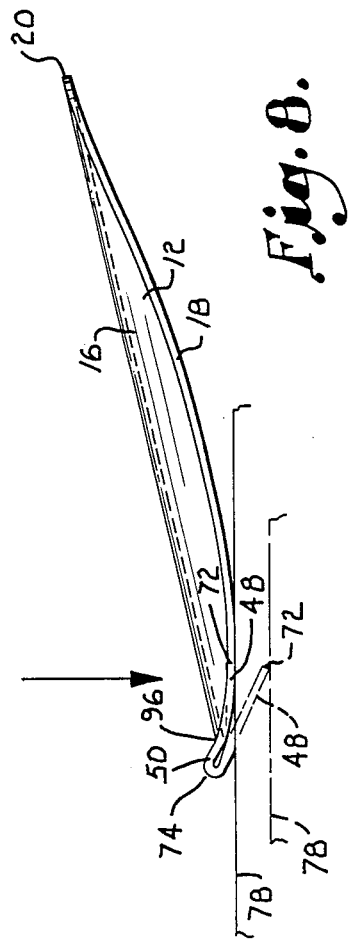
FIG. 8 is a side elevational view showing the manner in which the flap is bent toward the concave side of the blade body in order to complete the formation of the kicker of the blade.

After the handle 94 has been returned to the vertical position to release the kicker lip 50, the blade is removed from tool 76 and the final bending operation is effected in the manner best shown in FIG. 8. It is noted that at this point the flap 48 is oriented at the same angle as the lip 50 since the flap extends integrally from one part of the lip. The flap is bent toward the blade body by applying the flap to a flat surface such as the surface of the metal plate 78. The blade body is pressed toward the surface 78 until the curved edges 18 bottom out against surface 78 at a location adjacent to the junction line 96. Then, the curved tip 72 of flap 48 is substantially in line with the adjacent points on the two opposite edges 18. This assures that the tip 70 will be spaced from the concave surface 14 a distance of approximately 0.025 inch, thus providing a 0.025 inch gap which serves as a water scoop as the blade travels in the water.

The blade 10 constructed in accordance with the process of the present invention exhibits properties that are highly attractive to fish. When the lure is drawn along or near the surface of the water, the blade 10 is able to spin on wire 36, and the lip 50 acts in the manner of a stabilizer to maintain the blade at the proper orientation as it spins in the water. The scooping action provided by the gap formed between the flap 48 and the lure body 12 creates turbulence and a water pattern having a tornado type effect. In addition, a "rooster tail" water pattern is thrown out behind the blade as it moves in the water. The overall effect is similar to a buzzer bait effect.

When the blade is traveling beneath the surface of the water, it spins in the manner of a spinner bait and creates flashing light that is attractive to fish. In addition, the scooping action of the flap 48 creates a pattern of turbulence which is also attractive to fish. When the blade is moving in the water either above or below the surface, the clapper 44 strikes the blade body 12 and creates a rhythmical clapping sound which contributes to the appeal of the bait to fish.

In order to exhibit these actions in the water that attract fish, the kicker 46 must be carefully controlled as to the angles of its various bends and the dimensions of its various parts. The method of the present invention assures that the angles and dimensions are exactly as required, since the overall length of the flap 48 is determined by the depth of groove 62. The dimension of the lip 50 is controlled by the depth of the slot 88, and the angle of the lip is controlled by the angle of the inclined surface 84. Since the depths of the groove and slot and the angle of the inclined surface 84 are fixed, each blade which is constructed in accordance with the method of the present invention has exactly the same angles and dimensions of its kicker 46 and all of these angles and dimensions are exactly as required for the blade to exhibit the properties that have proven successful in attracting fish.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method of constructing a fishing lure blade from a blade body having opposing convex and concave surfaces and opposite end portions each terminating in a curved tip, said method comprising the steps of:
   providing a first tool having a groove with a size and shape to closely receive one end portion of the blade body therein and a preselected depth measured from an edge of the first tool located adjacent to the groove;
   inserting said one end portion of the blade body in said groove to the full depth thereof with the concave surface of the blade body against said edge of the first tool;
   bending the blade body about said edge while said one end portion remains in the groove to effect a bend of the blade body along a bend line substantially coincident with said edge, thereby forming a flap on said one end portion of the blade;
   bending said flap about said bend line until the tip of said one end portion is adjacent the concave surface of the blade body;
   providing a second tool having a slot with a width to receive the tab and blade body therein and a preselected depth, said second tool presenting an inclined surface spaced from said slot and oriented at an angle of approximately 45° relative to the depth dimension of the slot;
   inserting the blade body into said slot with the bend line entering the slot to the full depth thereof and with said convex surface facing said inclined surface;
   clamping the blade body rigidly in said slot;
   bending said blade body in a direction toward said inclined surface until said convex surface contacts said inclined surface, thereby forming a double thickness lip extending at an angle of approximately 45° to the convex surface and having a junction line with the blade body spaced from said bend line a distance equal to said preselected depth of the slot; and
   bending said tab toward said concave surface until the curved tip of said one end portion is spaced away from said concave surface by a preselected distance.

2. The method of claim 1, wherein:
said second tool includes a pair of blocks presenting said slot therebetween and relatively movable toward and away from one another; and
said clamping step comprises moving said blocks toward one another to clamp the blade body between the blocks.

3. The method of claim 2, wherein:
said blade body has curved side edges; and
said step of bending said tab toward said concave surface comprises applying the tab against a substantially flat surface and pressing the blade body toward said flat surface until said side edges of the blade body contact the flat surface at the location adjacent said junction line.

4. The method of claim 1, wherein:
said blade body has curved side edges; and
said step of bending said tab toward said concave surface comprises applying the tab against a substantially flat surface and pressing the blade body toward said flat surface until said side edges of the blade body contact the flat surface at the location adjacent said junction line.

* * * * *